US012767323B2

(12) United States Patent
Lee

(10) Patent No.: US 12,767,323 B2
(45) Date of Patent: Oct. 20, 2026

(54) STRUT AND LANDING GEAR INCLUDING STRUT

(71) Applicant: KOREA AEROSPACE RESEARCH INSTITUTE, Daejeon (KR)

(72) Inventor: Jung Jin Lee, Sejong-si (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 18/924,692

(22) Filed: Oct. 23, 2024

(65) Prior Publication Data

US 2025/0145281 A1 May 8, 2025

(30) Foreign Application Priority Data

Oct. 24, 2023 (KR) ........................ 10-2023-0142727

(51) Int. Cl.

*B64C 25/36* (2006.01)
*B64C 25/50* (2006.01)
*B64C 25/60* (2006.01)
*B64C 25/62* (2006.01)

(52) U.S. Cl.

CPC .............. *B64C 25/36* (2013.01); *B64C 25/50* (2013.01); *B64C 25/60* (2013.01); *B64C 25/62* (2013.01)

(58) Field of Classification Search

CPC ......... B64C 25/32; B64C 25/34; B64C 25/58; B64C 25/62; B64C 2025/325; F16L 9/006; F16L 9/22; B29L 2023/22; B29L 2031/06; B29L 2031/75

See application file for complete search history.

(56) References Cited

U.S. PATENT DOCUMENTS

| | | | | | |
|---|---|---|---|---|---|
| RE21,724 | E * | 2/1941 | Dowty | B64C 25/20 | 244/102 R |
| 3,945,625 | A * | 3/1976 | Duchemin | F16F 1/185 | 267/47 |
| 4,212,329 | A * | 7/1980 | Horton | F16L 9/22 | 138/158 |
| 5,060,886 | A | 10/1991 | Davis et al. | | |
| 2009/0050736 | A1* | 2/2009 | Bennett | B64C 25/34 | 244/102 R |
| 2011/0031348 | A1* | 2/2011 | Thompson | B64C 25/12 | 244/102 R |

FOREIGN PATENT DOCUMENTS

| | | | | | |
|---|---|---|---|---|---|
| JP | 2009516613 | A | | 4/2009 | |
| KR | 20150098731 | A | * | 8/2015 | B64C 25/58 |
| KR | 20170095056 | A | | 8/2017 | |
| KR | 20230071231 | A | | 5/2023 | |

OTHER PUBLICATIONS

Mechanical Properties of Carbon Fibre Composite Materials, Fibre / Epoxy resin (120 °C Cure). https://www.performance-composites.com/carbonfibre/mechanicalproperties_2.asp (Year: 2006).*

* cited by examiner

*Primary Examiner* — Ashesh Dangol
(74) *Attorney, Agent, or Firm* — McCoy Russell LLP

(57) ABSTRACT

The present disclosure relates to a strut and a landing gear including the strut, and more particularly, to an disclosure in which a strut is formed of a curved pipe formed of a flexible body to reduce a weight of a component, and at the same time, an impact load of the strut and the landing gear is alleviated through a design of the physical properties and shape of the strut.

11 Claims, 17 Drawing Sheets

STRUT AND LANDING GEAR INCLUDING STRUT

CROSS-REFERENCE TO RELATED APPLICATION

This application claims priority under 35 U.S.C. § 119 to Korean Patent Application No. 10-2023-0142727, filed on Oct. 24, 2023, in the Korean Intellectual Property Office, the disclosure of which is incorporated herein by reference in its entirety for all purposes.

TECHNICAL FIELD

The following disclosure relates to a strut and a landing gear including the strut, and more particularly, to an disclosure in which a strut is configured of a curved pipe to reduce a weight of a part, and at the same time, an impact load of the strut and the landing gear is alleviated through physical properties and a shape design of the strut.

BACKGROUND

A landing gear refers to an undercarriage used for takeoff or landing of an aircraft. The landing gear is a device that supports an aircraft when the aircraft is taxiing, landing on the ground. The aircraft generally has a three-point support with one landing gear at the front and two landing gears at the center.

Each landing gear is provided with at least one wheel and a shock absorber to absorb the kinetic energy during landing and taxing. Various types of shock absorbers are used. There are mainly pneumatic, spring, and leaf spring types.

Depending on the characteristics of the aircraft, large aircraft may use the pneumatic type, while small aircraft may use the leaf spring type or a type of absorbing shock with rubber. The conventional landing gear corresponding to an example of this type is illustrated in FIG. 1. However, a strut of this type is mainly formed of rigid bodies, and thus, is hardly deformed, and absorbs shock using a piston-type shock absorber.

Therefore, the conventional landing gear are mainly formed of rigid bodies, and uses various parts to connect each rigid body and perform a shock absorbing function, so there is a problem in that maintenance is difficult and the weight of the landing gear is heavy.

RELATED ART DOCUMENT

Patent Document (Patent Document 1) Japanese Patent Laid-open Publication No. 2009-516613 (Published on Apr. 23, 2009)

SUMMARY

An embodiment of the present disclosure is directed to reducing a weight of a part by configuring a strut as a curved pipe formed of a flexible body instead of a rigid body, and at the same time, reducing an impact load of a landing gear by deforming the strut, and reducing a reaction load by providing a damper.

In one general aspect, a strut configured of a hollow pipe includes: a first strut; and a second strut that is formed by extending from a rear end of the first strut, in which the first strut and the second strut are curved pipes, and the first strut and the second strut are connected to form a C-shape.

The first strut and the second strut may be formed integrally.

The first strut and the second strut may be each formed as separate members, the strut may further include a coupling connecting the first strut and the second strut, and the rear end of the first strut and a front end of the second strut may be connected by the coupling.

An inner diameter of the first strut may increase linearly from a front end to the rear end of the first strut, and an inner diameter of the second strut may decrease linearly from the front end to a rear end of the second strut.

When a smallest diameter among the inner diameters of the first strut is $D_a$ and a largest diameter is $D_b$, $D_b/D_a \geq 1.25$ may be satisfied.

When a largest diameter among the inner diameters of the second strut is De and a smallest diameter is $D_a$, $D_c/D_a \geq 1.25$ may be satisfied.

A pipe thickness of the first strut may be constant from a front end to the rear end of the first strut, a pipe thickness of the second strut may be constant from a front end to a rear end of the second strut, and the pipe thickness of the first strut may be greater than or equal to that of the second strut.

When the pipe thickness of the first strut is $t_1$, and the pipe thickness of the second strut is $t_2$, $t_1/t_2 \geq 1.25$ may be satisfied.

When an imaginary line connecting a center of a pipe at a front end of the first strut and a center of a pipe at a rear end of the second strut may be L, an angle formed by L with a horizontal plane may be greater than or equal to 70°.

The strut may further include a damper, in which one end of the damper may be connected to a front end of the first strut, and the other end may be connected to a rear end of the second strut, and the damper may absorb shock when the first strut and the second strut are deformed by the shock.

The damper may include a spring that absorbs the shock.

At least one of the first strut or the second strut may be made of a composite material, and the composite material may be designed to have a modulus E of elasticity value within a predetermined range.

The composite material may be designed to have a modulus E of elasticity value of 30 Gpa or more and 150 Gpa or less.

In another general aspect, a landing gear including the strut described above includes: a strut; a mounting unit that supports the strut on an aircraft; and a wheel that contacts a ground during landing.

The landing gear may further include a steering device that is connected to the strut and changes a direction of the strut and the wheel.

DETAILED DESCRIPTION OF MAIN ELEMENTS

Figure 1:
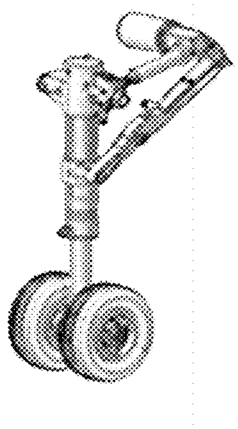
FIG. 1 is a drawing illustrating a conventional landing gear.

1000: Landing gear
100: Strut
110: First strut
120: Second strut
130 (130A, 130B): Coupling
200: Damper
230: Spring
300: Mounting unit
310: Fixed member
320: Connecting member
330: Protruding hole
400: Wheel
500: Steering device

DETAILED DESCRIPTION OF EMBODIMENTS

Hereinafter, the present disclosure will be described in detail with reference to the attached drawings. However, this is merely exemplary, and the present disclosure is not limited to the specific embodiments described by way of example.

A strut 100 according to the present disclosure is applied to a landing gear 1000 of an aircraft, and the aircraft may correspond to an aircraft, a helicopter, a drone, etc.

Hereinafter, the landing gear 1000 including the strut 100 according to an example of the present disclosure will be described with reference to FIGS. 2 to 5.

Figure 2:
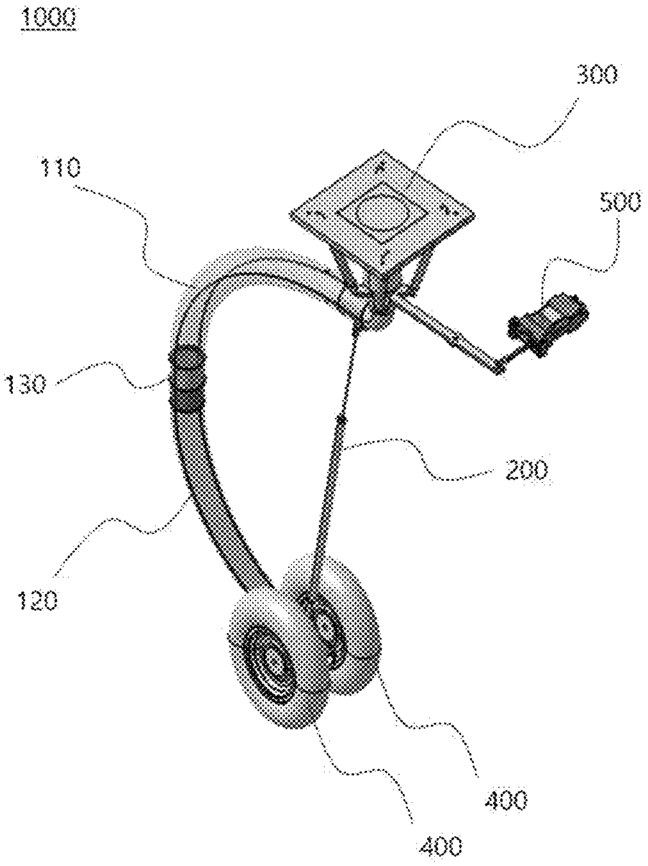
FIG. 2 is an overall perspective view of a landing gear according to an example of the present disclosure.

FIG. 2 illustrates an embodiment of the landing gear 1000 according to the present disclosure, and the landing gear 1000 includes the strut 100, a damper 200, a mounting unit 300, and a wheel 400, and may further include a steering device 500.

The strut generally means a pillar, a support, etc. that supports an aircraft so that the aircraft does not fall down, and the strut 100 according to an example of the present disclosure is configured to support the wheel 400 when the aircraft lands and absorb shock applied to the wheel 400, thereby serving to alleviate the shock applied to the aircraft.

The strut 100 is configured as a hollow pipe and may include a first strut 110 and a second strut 120. The first strut 110 and the second strut 120 may be configured to be extended and connected to form a C-shaped curve.

According to the first embodiment of the present disclosure, the first strut 110 and the second strut 120 may be configured in a manner in which they are each manufactured as separate members and then connected through a coupling 130 to be described later. When the first strut 110 and the second strut 120 are manufactured separately, it may provide an advantage in that productivity is improved because each strut may be easily removed from a mold.

Meanwhile, according to a second embodiment of the present disclosure, the first strut 110 and the second strut 120 may be formed integrally. The meaning of being formed integrally may correspond to the meaning of being manufactured by integrating the first strut and the second strut into a single part rather than manufacturing them separately. The first strut 110 and the second strut 120 may be formed integrally, for example, using a 3D printing technique. When the first strut and the second strut are formed integrally, a connecting part may be removed, thereby reducing the possibility of quality defects and occurrence of defects and reducing the risk of breakage. In addition, it provides the advantage of optimizing a strength and stiffness ratio and minimizing a weight without restrictions on a thickness and diameter.

Hereinafter, the present disclosure will be described mainly with reference to the first embodiment.

The damper 200 will be described. When the aircraft lands, the C-shaped strut 100 undergoes elastic deformation due to the impact load between the ground and the aircraft, and the damper is connected to each end of the C-shaped strut 100, so that when the strut 100 undergoes elastic deformation, the damper 200 contracts, and then the damper 200 operates, thereby minimizing the recoil energy after the strut 100 undergoes elastic deformation. In this way, the damper 200 may minimize the recoil energy to prevent the aircraft from bouncing off the ground and stabilize the landing gear to improve driving performance.

Figure 3:
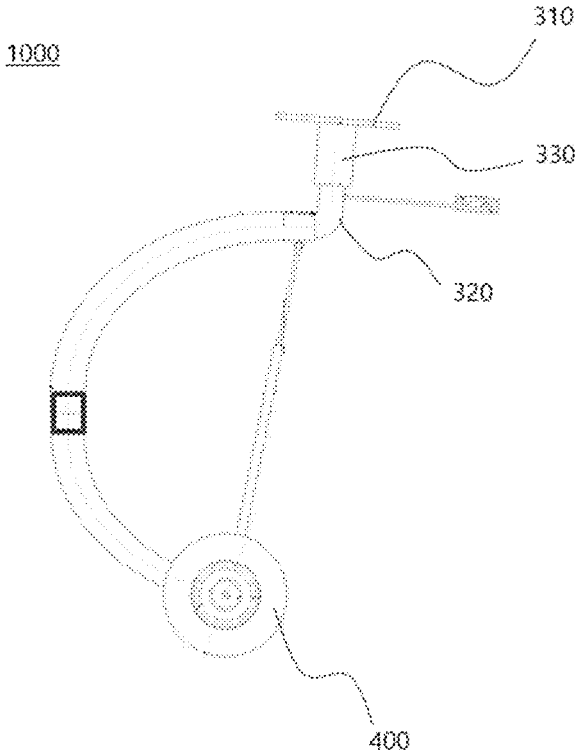
FIG. 3 is a front view of FIG. 2.

Next, the mounting unit 300 will be described with reference to FIG. 3. The mounting unit 300 is a means for connecting the strut 100 and the body of the aircraft, and allows the strut 100 to be mounted on the aircraft.

The mounting unit 300 may include a fixed member 310 that is coupled to the aircraft and fixes the landing gear 1000 to the aircraft, and a connecting member 320 that connects the fixed member 310 and the strut 100.

The fixed member 310 may be coupled to the aircraft by a bolting connection, a brazing connection, or the like. The connecting member 320 may be configured as a pipe that extends from the strut 100, and the fixed member 310 and the connecting member 320 may be coupled by a pipe connection method.

For example, the fixed member 310 and the connecting member 320 may be connected by a manner in that a protruding hole 330 for receiving the connecting member 320 may be formed on an opposite surface of a portion where the fixed member 310 is coupled to the aircraft and the pipe-type connecting member 320 is inserted into the protruding hole 330, and it goes without saying that the fixed member 310 and the connecting member 320 may be connected by other methods.

In the same manner as described above, the mounting unit 300 may connect the strut 100 and a body of the aircraft, thereby mounting the strut 100 on the aircraft.

Next, a wheel 400 will be described. The wheel 400 is a component corresponding to a wheel that comes into contact with the ground when the aircraft lands and allows the aircraft to roll on the ground. According to an example of the present disclosure, one end of the strut 100 is connected to the mounting unit 300 described above, and the wheel 400 is arranged at the other end of the strut 100. The wheel 400 is a component that is first subjected to shock when the aircraft lands, and a rubber tire or the like is provided on an outer circumferential surface of the wheel 400 to alleviate the shock applied to the wheel 400.

Figure 4:
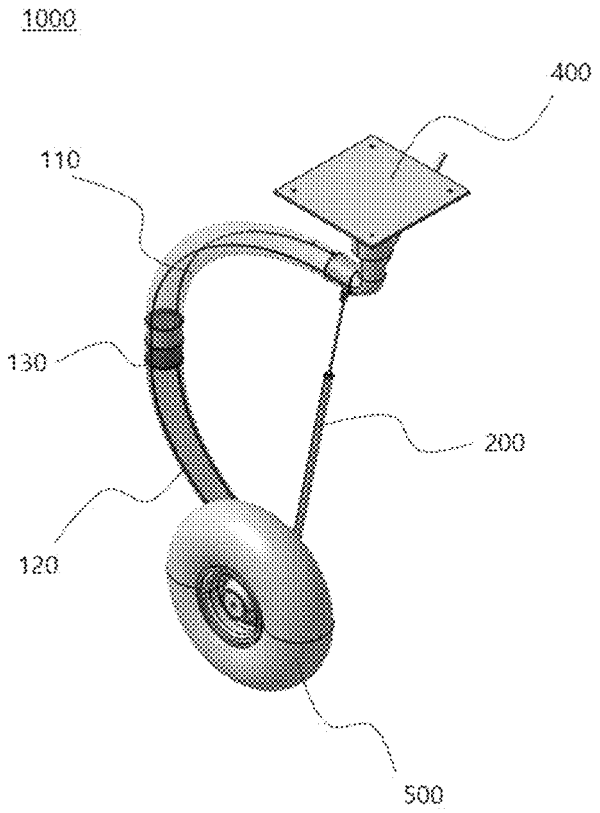
FIG. 4 is an overall perspective view of a landing gear according to another example of the present disclosure.

The wheel 400 may be arranged on each side of the strut 100 as illustrated in FIG. 2, or may be arranged on only one side of the strut 100 as illustrated in FIG. 4. Elements such as a shaft and bearing may be provided between the wheel 400 and the strut 100 to assist the rotation of the wheel 400.

Figure 5:
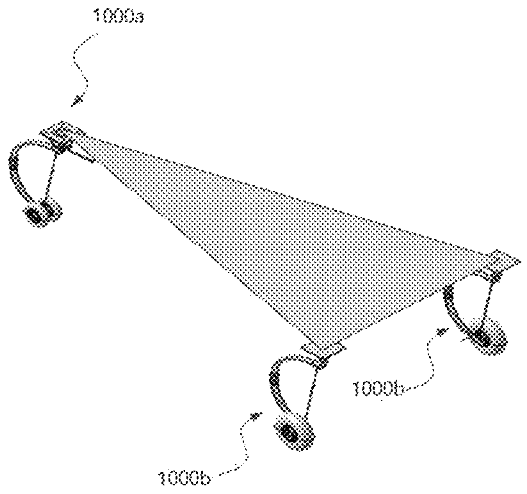
FIG. 5 is a diagram schematically illustrating a state in which landing gears according to an example of the present disclosure are combined with an aircraft.

Meanwhile, in FIG. 5, a landing gear **1000*a* arranged at the front of the aircraft has the wheels 400 arranged on each side centered around the strut 100, and a landing gear 1000*b* arranged at the center or rear has wheels 400 arranged on only one side centered around the strut 100**.

Since it is common to have only one landing gear **1000*a* at the front of the aircraft, in terms of load distribution of the front landing gear 1000*a*, it may be preferable for the front landing gear 1000*a* to have wheels 400 arranged on each side centered around the strut 100 as illustrated in FIG. 5**.

Next, the steering device 500 will be described. The steering is a general term for parts that allow a vehicle, etc., to follow a desired course, and refers to a system such as a connecting device.

As described above, the landing gear 1000 is generally provided with one on the front side of the aircraft and two on the rear side, and the landing gear **1000*a* on the front side may further include the steering device 500 to control the direction of the aircraft, and the landing gear 1000*b* on the rear side may not include the steering device 500**.

The steering device 500 according to an example of the present disclosure is connected to one end of the strut 100, and the direction of the strut 100 and the wheel 400 may be changed through the steering device 500 to control the movement path of the aircraft.

FIG. 5 illustrates that one landing gear **1000*a* equipped with a steering device 500 is provided on the front side of the aircraft, and two landing gears 1000*b* not equipped with the steering device 500** are provided on both sides of the rear side of the aircraft. In this way, it may be preferable to provide the steering device on the landing gear on the front side of the aircraft in terms of controlling the direction of the aircraft.

In addition, the steering device 500 may further include a power driving device such as an actuator to prevent damage to the motor due to a large load that may be applied when changing the direction of the strut and wheel.

Next, the strut 100 will be described in detail with reference to FIG. 6. The strut 100 according to an example of the present disclosure may include the first strut 110 arranged closer to the body of the aircraft, the second strut 120 arranged relatively farther from the body of the aircraft and having a lower end coupled with the wheel 400, and may further include a coupling 130 connecting the first strut 110 and the second strut 120.

Figure 7A:
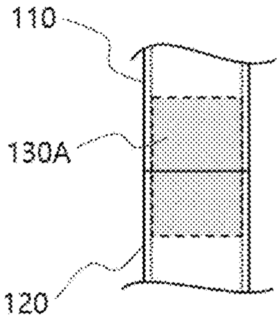
FIGS. 7A and 7B are enlarged views of the strut according to the first embodiment of the present disclosure.
Figure 7B:
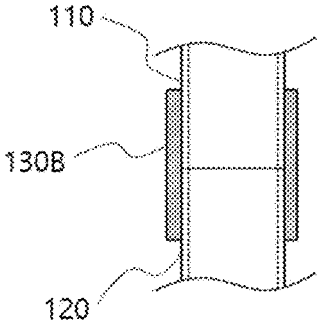

Specifically, the coupling 130 may connect the rear end of the first strut 110 and the front end of the second strut 120, and the following describes an embodiment of the coupling 130 with reference to FIGS. 7A and 7B.

As an example, a coupling 130A may be formed of an internal coupling structure such as an insert. In general, the insert refers to a component that is inserted by being fitted into a pipe, etc., and corresponds to an internal coupling method. According to an example of the present disclosure, one side of the coupling 130A may be partially inserted into the rear end of the first strut 110, and the other side of the coupling 130A may be partially inserted into the front end of the second strut 120. As described above, when the coupling 130A is inserted into the inside of the first strut 110 and the second strut 120 to connect two members, the coupling 130 may be protected from external shock, thereby reducing the risk of mechanical damage, and the outer surface of the entire strut may be configured smoothly, thereby minimizing flow resistance.

As another example, a coupling 130B may be formed of an external coupling structure such as a socket or a flange. According to one example of the present disclosure, the coupling 130B may be configured to externally surround a portion where the first strut 110 and the second strut 120 are connected. That is, a rear end of the first strut 110 may be inserted into one side of the coupling 130B, and a front end of the second strut 120 may be inserted into the other side. As described above, when the outsides of the first strut 110 and the second strut 120 are surrounded and the first strut 110 and the second strut 120 are connected, the installation and removal of the coupling 130B may be easily performed, which may improve productivity, and may be advantageous in terms of inspection and maintenance.

As described above, the first strut and the second strut may be connected through one method selected from the external coupling method or the internal coupling method. This may be selected as an appropriate method depending on the flow resistance, the external shock, the mechanical strength, the maintenance necessity, etc.

According to an example of the present disclosure, since the first strut 110 and the second strut 120 may be connected through the coupling 130, the first strut 110 and the second strut 120 may be manufactured as separate parts, which improves manufacturing convenience of the struts.

Next, referring back to FIG. 6, the shapes of the first strut 110 and the second strut 120 will be described in detail. The first strut 110 is configured as a hollow pipe and is configured as a curved pipe. Specifically, an inner diameter of the first strut 110, that is, an inner diameter of the pipe, may be configured to vary from one end to end of the first strut 110, and may be configured to vary while the inner diameter increases linearly. In addition, the inner diameter of the second strut 120 may be configured to vary while linearly decreasing from one end to an end of the second strut 120.

In this way, the inner diameters of the first strut 110 and the second strut 120 are configured in a mold manner in which they linearly increase or decrease, so that the struts may be easily removed from the mold after the strut molding, and the work process may be shortened.

More specifically, when the smallest diameter among the inner diameters of the first strut 110 is $D_a$ and the largest diameter is $D_b$, $D_b/D_a \geq 1.25$ may be satisfied. In addition, when the largest diameter among the inner diameters of the second strut 120 is $D_c$ and the smallest diameter is $D_a$, $D_c/D_a \geq 1.25$ may be satisfied. It may be preferable to design the first strut 110 and the second strut 120 to satisfy these formulas in terms of the safety and manufacturing convenience of the struts. When the inner diameters of the strut are the same, the thickness should be manufactured to be thick in the center while being linear or changing, and there is a problem that the struts are not easily removed from the mold after the strut molding.

Meanwhile, the first strut 110 may be configured so that the thickness of the pipe is constant, and the second strut 120 may also be configured so that the thickness of the pipe is constant. It may be preferable to maintain the thickness of the strut constant in terms of the convenience of manufacturing the strut.

However, a thickness $t_1$ of the pipe of the first strut 110 is configured to be greater than or equal to a thickness $t_2$ of the pipe of the second strut 120, because a greater impact load is applied to the first strut 110 which is arranged closer to the body of the aircraft, compared to the second strut 120 which is arranged farther from the body of the aircraft.

In other words, the thickness $t_1$ of the pipe of the first strut 110 is configured to be greater than or equal to the thickness $t_2$ of the pipe of the second strut 120, so that the impact load applied to the first strut 110 may be well distributed, thereby improving the safety.

More specifically, when the thickness of the pipe of the first strut is $t_1$, and the thickness of the pipe of the second strut is $t_2$, it may be preferable to satisfy $t_1/t_{2 \geq 1.25}$ in terms of the safety of the strut.

Figure 6:
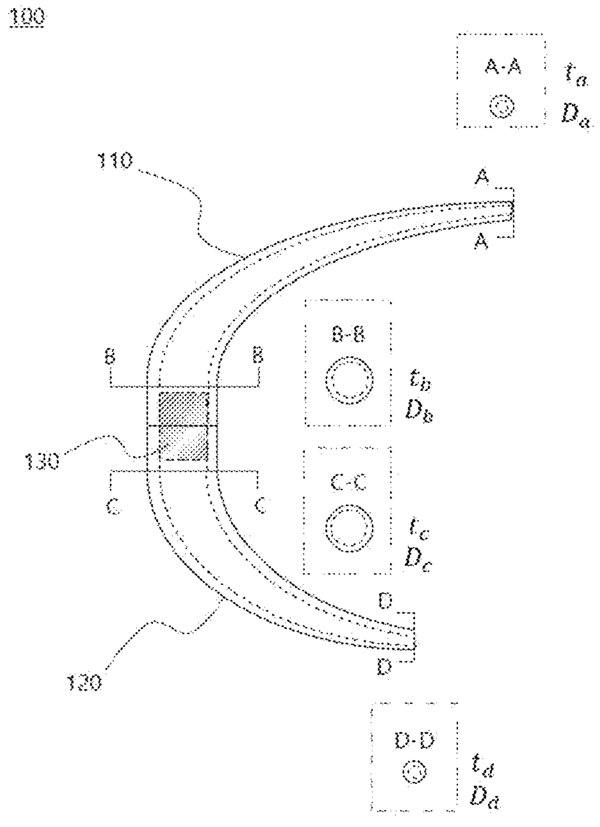
FIG. 6 is a front view of a strut according to a first embodiment of the present disclosure.

For example, as illustrated in FIG. 6, the inner diameter of one end of the first strut 110 is $D_a$, the thickness of the pipe at that part is $t_a$, the inner diameter of the other end of the first strut 110 is $D_b$, and the thickness of the pipe at that part is $t_b$. In addition, the inner diameter of one end of the second strut 120 is $D_c$, the thickness of the pipe at that part is $t_c$, and the inner diameter of the other end of the second strut 120 is $D_a$, and the thickness of the pipe at that part is $t_d$.

In this case, the inner diameter of the first strut 110 linearly increases from one end to the other end, showing that $D_b$ is larger than $D_a$, and the inner diameter of the second strut 120 linearly decreases from one end to the other end, showing that $D_a$ is smaller than $D_c$. Here, $D_b$ and $D_c$ may be the same so that the inner diameters of the connecting parts where the first strut 110 and the second strut 120 are connected are the same.

In addition, the thickness $t_1$ of the pipe of the first strut 110 is configured to be constant so that $t_1=t_a=t_b$ may be satisfied, and the thickness $t_2$ of the pipe of the second strut 120 is also configured to be constant so that $t_2=t_c=t_d$ may be satisfied.

Figure 8:
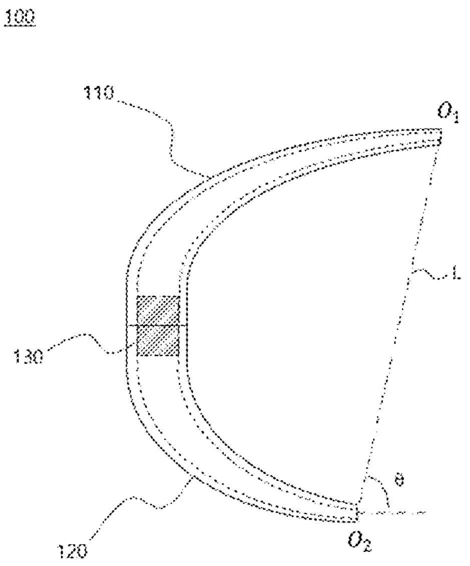
FIG. 8 is a front view of the strut according to the first embodiment of the present disclosure.

Next, the strut 100 will be described in detail with reference to FIG. 8. A center of the pipe at the opposite end of the portion where the first strut 110 is connected to the second strut 120 is referred to as $O_1$, and the center of the pipe at the opposite end of the portion where the second strut 120 is connected to the first strut 110 is referred to as $O_2$. In this case, when an imaginary line connecting $O_1$ and $O_2$ is L, L forms a certain angle q with the horizontal plane, and it is better to be larger than a slip displacement due to frictional force during landing, and the angle may be greater than or equal to 70°.

When the above-described angle is configured to be smaller than 70°, the first strut 110 becomes excessively longer than the second strut 120, which causes the strut to become unbalanced, and furthermore, the strut do not properly perform their buffering role. Therefore, in terms of preventing this problem, it is preferable that the angle q is greater than or equal to 70°.

As described above, the strut 100 is designed to effectively alleviate the impact applied to the aircraft, and furthermore, improve the manufacturing convenience of the strut 100. In addition, when the strut 100 is configured as a hollow pipe and applied to the landing gear, it is possible to provide the landing gear that is lighter than the conventional landing gear.

Next, the damper 200 will be described in detail with reference to FIGS. 9A and 9B. In order for the strut 100 to effectively absorb the shock when the aircraft lands, sufficient deformation should occur in the strut 100. When the strut 100 is deformed and then returns to its original shape, large recoil energy is generated, causing the aircraft to shake greatly up and down.

Therefore, according to an example of the present disclosure, the damper 200 may be provided to absorb the recoil energy and alleviate the shaking of the aircraft, and one end of the damper 200 may be connected to an upper end of the first strut 110, and the other end of the damper 200 may be connected to a lower end of the second strut 120.

Figure 9A:
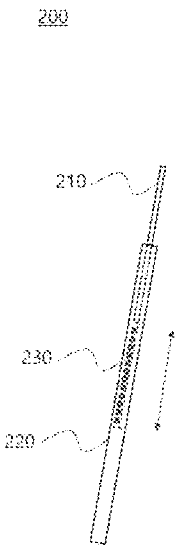
FIGS. 9A and 9B are diagrams illustrating a damper according to the first embodiment of the present disclosure.
Figure 9B:

When the shock is applied to the strut 100, the strut 100 is deformed into a shape in which a gap between the upper end of the first strut 110 and the lower end of the second strut 120 becomes narrower, so the damper 200 connected to the upper end of the first strut 110 and the lower end of the second strut 120 is reduced in length as illustrated in FIGS. 9A and 9B. In this way, the length of the damper 200 is reduced along with the deformation of the strut 100, and the damper 200 absorbs the recoil energy as its length is reduced.

Furthermore, the damper 200 may further include a spring 230, and by including the spring 230, provides the advantage of being able to more effectively absorb the recoil energy, i.e., the shock.

Next, the material of the strut 100 will be described. At least one of the first strut 110 or the second strut 120 may be made of a composite material. The composite material is a material that has properties that may not be obtained with a single material by pairing different types of materials, and means a special material that may be designed as a material having desired properties by mixing various raw materials.

According to an example of the present disclosure, the first strut 110 or the second strut 120 may be made of a composite material designed to have a modulus E of elasticity value within a desired predetermined range. The modulus of elasticity value of the composite material may be determined according to the weight of the aircraft and the landing conditions of the aircraft, and more specifically, the modulus E of elasticity value may be designed to be 30 Gpa or more and 150 Gpa or less.

The composite material described above may be a material with excellent ductility, and since the strut 100 is made of a composite material having the above-described characteristics and properties, the elastic deformation of the strut 100 according to an example of the present disclosure increases compared to the strut applied to a conventional landing gear when the aircraft lands, thereby effectively alleviating the shock.

Next, the effects of the strut 100 and the landing gear 1000 according to an example of the present disclosure will be described with reference to FIGS. 10 to 14.

Figure 10:
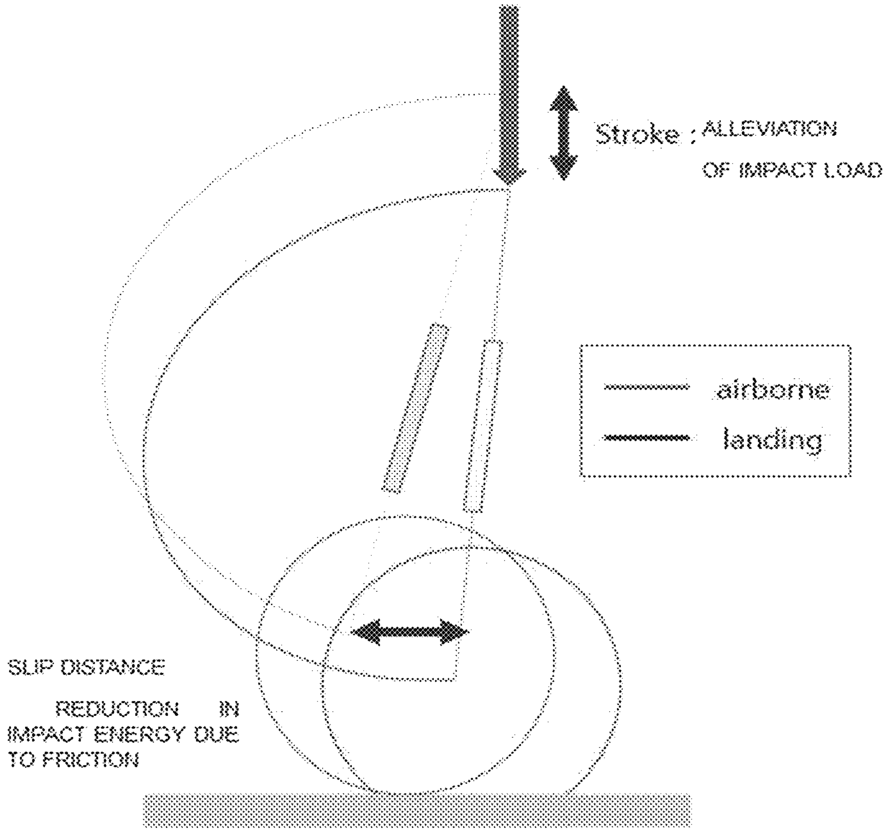
FIG. 10 is a diagram schematically illustrating a shape of the landing gear during flight and landing.

FIG. 10 is a diagram for describing the principle of the shape of the landing gear 1000 being deformed when the aircraft lands to alleviate the impact load, and FIGS. 11 to 14 are diagrams illustrating simulation results of the landing gear according to an example of the present disclosure.

Figure 11:
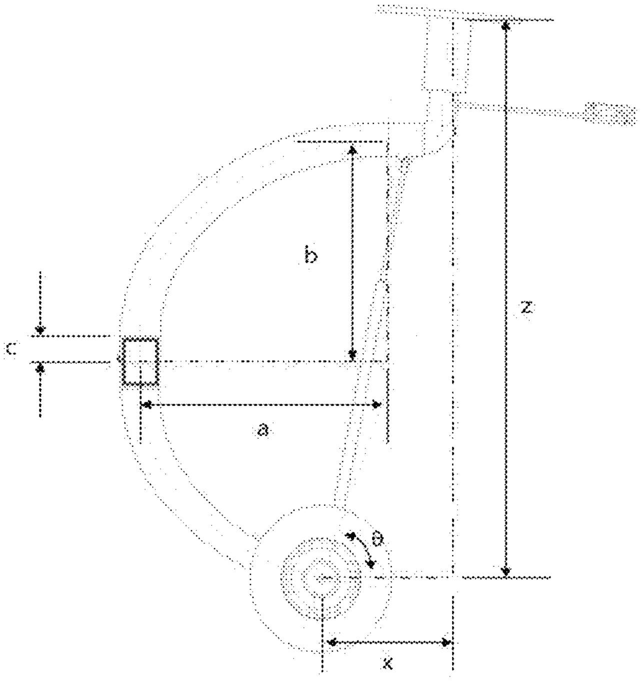
FIG. 11 is a diagram illustrating simulation design values of the landing gear according to the first embodiment of the present disclosure.
Figure 12:
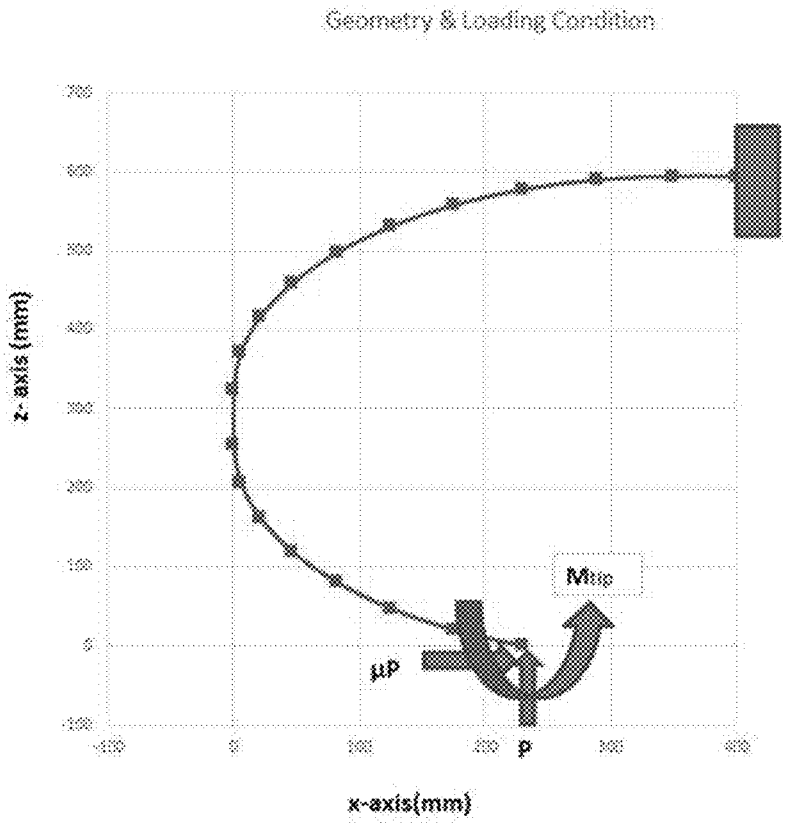
FIG. 12 is a diagram for describing the shape of the landing gear and applied load conditions according to the first embodiment of the present disclosure.
Figure 13:
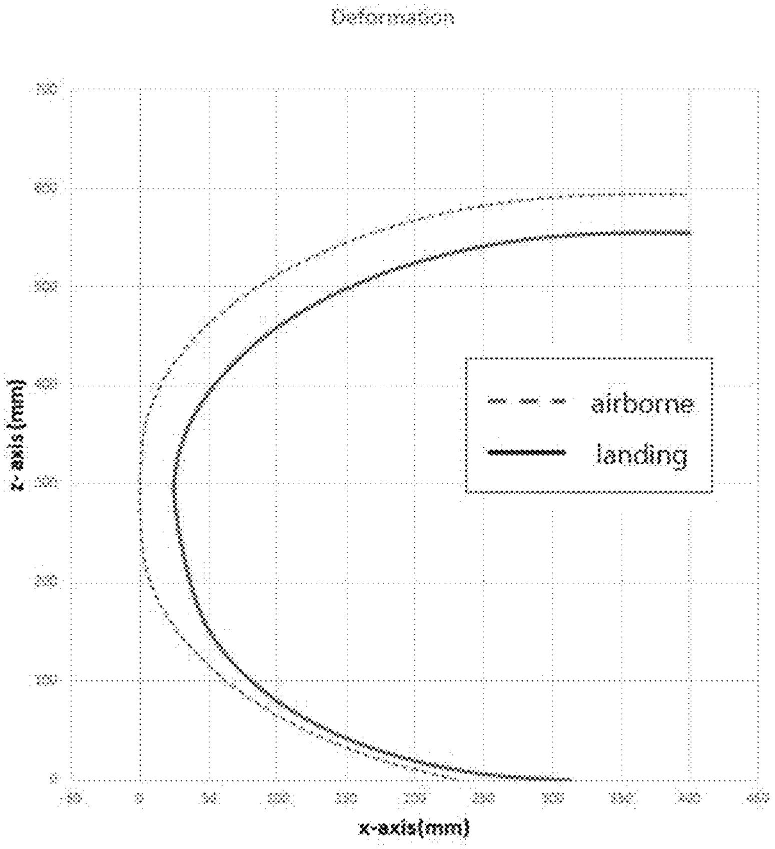
FIG. 13 is a diagram illustrating a deformation amount of the strut according to the first embodiment of the present disclosure.
Figure 14:
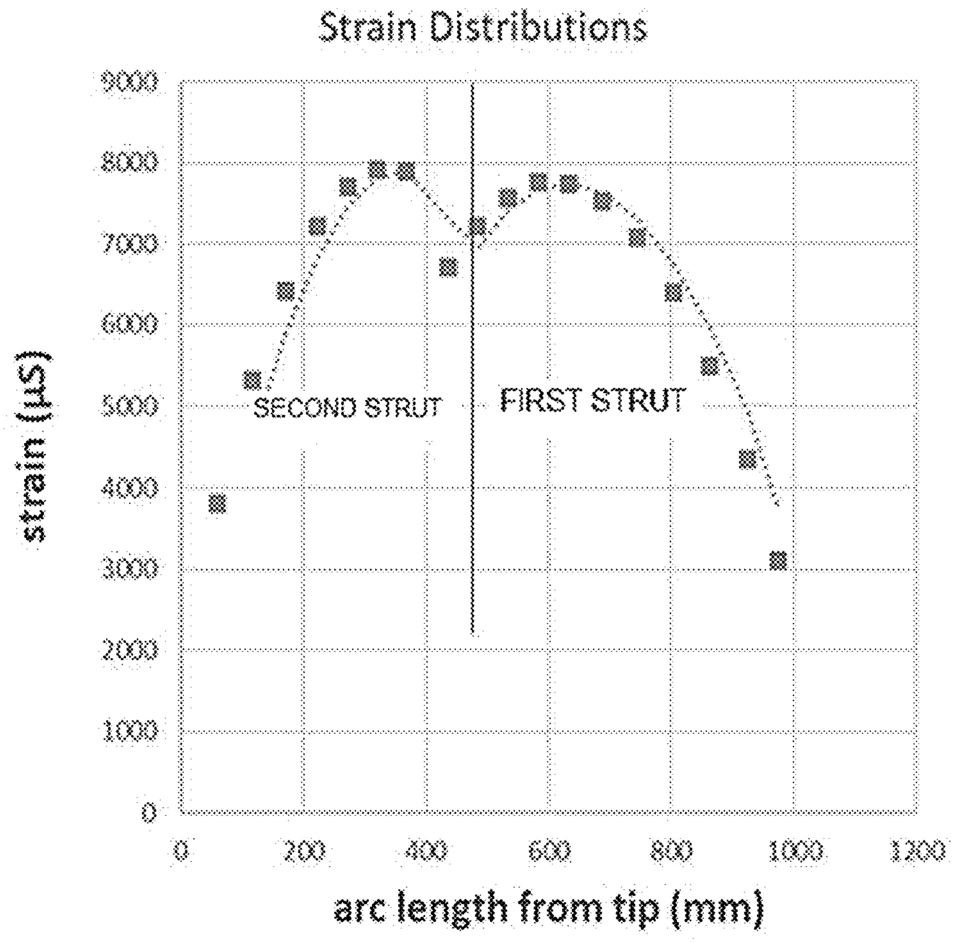
FIG. 14 is a diagram illustrating a strain distribution of a first strut and a second strut according to the first embodiment of the present disclosure.

Referring to FIG. 10, it can be seen that the C-shaped structure of the strut 100 is compressed when the aircraft lands and the elastic deformation occurs, and the impact load is alleviated by this stroke method. Furthermore, it can be confirmed that the elastic deformation of the strut 100 causes slippage on the wheel 400, and that the impact energy is secondarily reduced by this sliding friction. FIG. 11 is a diagram illustrating the specifications of the landing gear used in the simulation. The landing gear is designed to have the values of x=170 mm, z=594 mm, a=350 mm, b=270 mm, c=35 mm, and q=70°, and designed so that the modulus E of elasticity of the first strut and the second strut is 40 Gpa, the minimum diameter of the first strut is R1=20 mm, the maximum diameters of the first and second struts are R2=25 mm, the minimum diameter of the second strut is R3=15 mm, the thickness of the first strut is $t_{1=2.5}$ mm, and the thickness of the second strut is $t_{2=2}$ mm to perform the simulation. In the case of the above conditions, the weight of the first strut 110 and the second strut 120 is only about 550 g, which is reduced by more than 90% compared to the struts of the conventional landing gear. FIG. 12 illustrates the force and moment applied to the landing gear, and the simulation is performed under the assumption that an impact load is applied to a front landing gear of an aircraft of 600 kg. It was assumed that a landing load P of the front landing gear is 360 kg, a ground friction coefficient μ is 0.3, and a rotational moment $M_{tip}$ by a wheel is 16,200 kg·mm. Referring to FIGS. 13 and 14, a vertical displacement of the strut 100 during landing corresponds to 39 mm, so it may be confirmed that the elastic deformation of the strut 100 occurs significantly and it may be predicted that the impact load applied to the landing gear 1000 is alleviated. Furthermore, as the elastic deformation of the strut 100 occurs, slipping occurs on the wheel 400. Under the conditions described above, the simulation result shows that the slip distance corresponds to 83 mm, and it may be predicted that the effect of secondary reduction of the impact energy is achieved by this sliding friction. Also, referring to FIG. 13, the strain of the strut 100 is at most 7920 μs, and corresponds to a design maximum allowable value of 8000 μs or less, so it can be confirmed that the strut 100 according to an example of the present disclosure is sufficiently safe.

Figure 15:
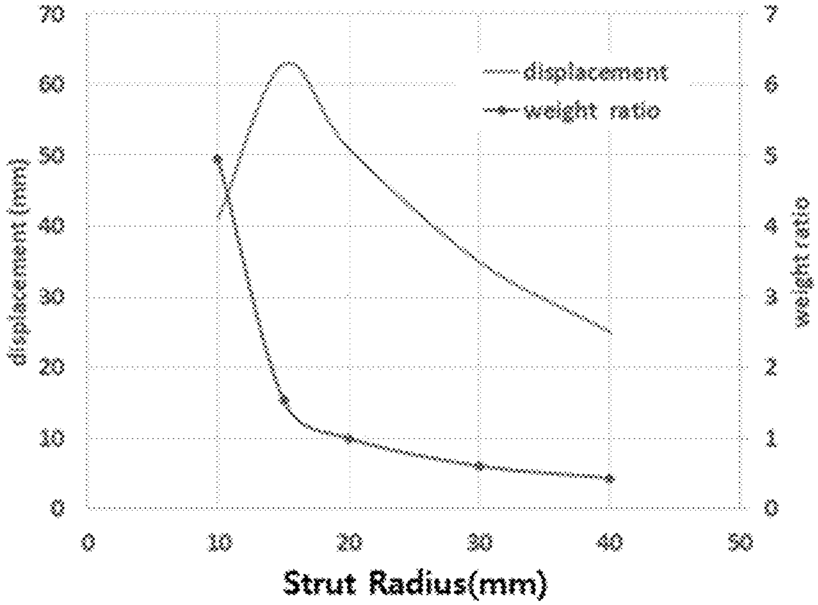
FIG. 15 is a simulation diagram of a deformation and weight ratio according to average radii of a strut according to a second embodiment of the present disclosure.
Figure 16:
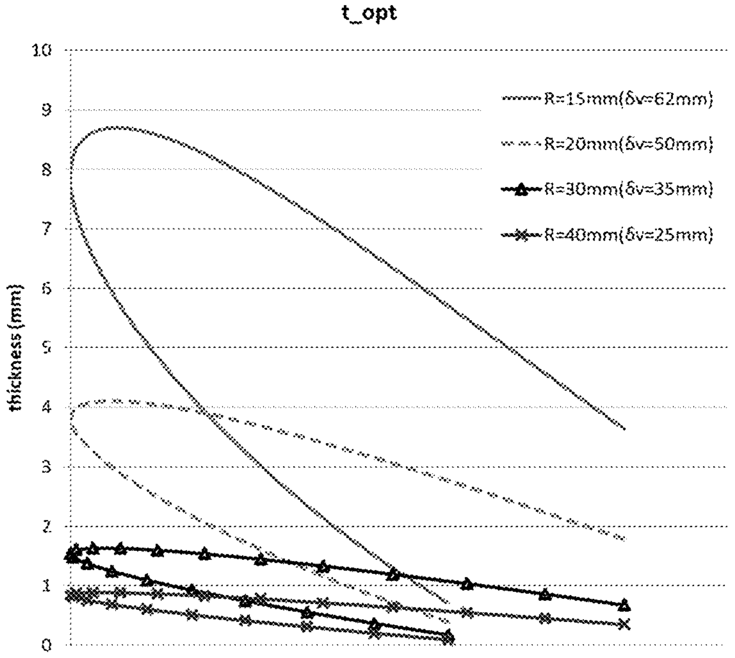
FIG. 16 is an exemplary diagram of an optimized shape according to the second embodiment of the present disclosure.
Figure 17:
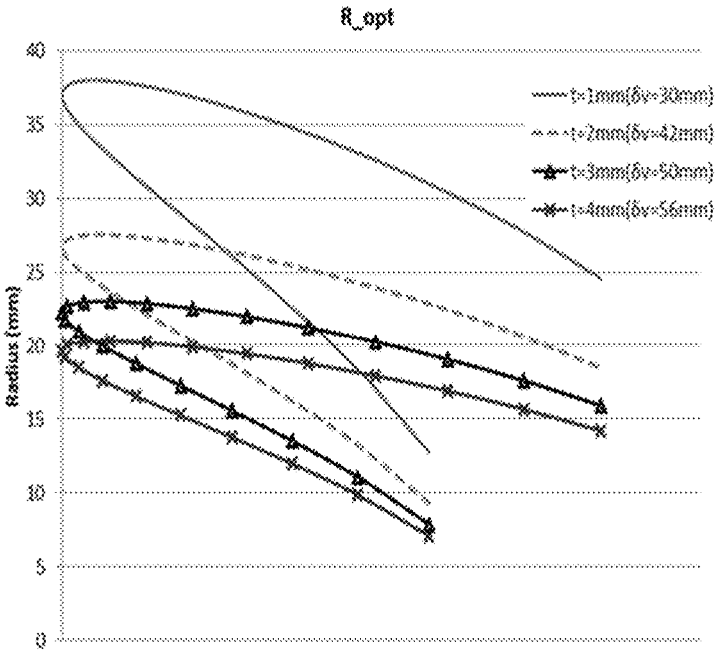
FIG. 17 is an exemplary diagram of an optimized shape according to the second embodiment of the present disclosure.

Hereinafter, the second embodiment of the present disclosure will be described with reference to FIGS. 15 and 16. FIG. 15 illustrates the displacement and weight ratio according to an average radius of the strut, respectively, and FIGS. 16 and 17 illustrate optimized shapes derived through the simulation in the case where the first strut 110 and the second strut 120 are formed integrally. In the case of a tube pipe, the strength is proportional to $R^2t$, and the rigidity is proportional to $R^3t$. Here, R represents the radius of the pipe, and t represents the thickness of the pipe. In other words, the strength is proportional to the square of the radius, but the rigidity is proportional to the cube of the radius, so the larger the radius, the greater the rigidity becomes than the strength. Therefore, when the radius increases, the rigidity becomes excessively large, and thus, the ability to absorb shock decreases, making it unsuitable for use as the landing device. When the aircraft including the strut according to the present disclosure lands, an energy equation applied to the strut 100 may be expressed as shown in [Equation 1] below.

$$\frac{1}{2}mv^2 + mgS = \frac{1}{2}maS \qquad \text{[Equation 1]}$$

(Here, S denotes the vertical displacement of the strut during landing, v denotes the sink velocity, m denotes the mass of the aircraft, and a denotes the acceleration.)

When the vertical displacement of the strut during landing is represented again, it is as shown in [Equation 2] below.

$$S = \delta_v + \delta_{tire} \qquad \text{[Equation 2]}$$

(Here, δ denotes the displacement due to the deformation of the strut, § tire denotes the displacement due to the deformation of the tire.)

Assuming v=2 m/s, S=203 mm, a≤4 g, and $\delta_{tire}$=0.75 S, and substituting it into [Equation 1] and [Equation 2], it can be seen that $\delta_v \geq 0.051$ m. That is, under the assumption above, it may be preferable to design the strut 100 so that the vertical displacement is at least 50 mm, which will be described below with reference to FIG. 15 and [Table 1].

Referring to the graph of FIG. 15, the largest deformation occurs when the radius is about 15 mm. The deformation tends to decrease based on a radius of about 15 mm. The weight increase as the radius decreases. Comparing the weight ratio, the weight of the 15 mm radius strut is more than 1.5 times the weight of the 20 mm is over 1.5 times the radius strut. It can be confirmed that when the average radius is 20 mm or less, the design value is reasonable. Referring to [Table 1] below, when the thickness of the strut is constant, the deformation increases as the thickness increases. This is because the radius decreases.

In addition, it could be seen through the simulation that the vertical displacement occurs by 50 mm when the thickness t of the strut is 3 mm. In other words, it could be seen that sufficient displacement occurs when the average radius is 3 mm or more, and the impact load applied to the strut is alleviated.

TABLE 1

| t(mm) | $\delta_v$(mm) | R(mm) |
|---|---|---|
| 1 | 30 | 12.7~38 |
| 2 | 42 | 9.3~27.5 |
| 3 | 50 | 7.8~23 |
| 4 | 56 | 7.1~20.3 |

FIG. 16 illustrates the simulation of the thickness-optimized shape when the average radius of the strut is constant at 15 mm, 20 mm, 30 mm and 40 mm. FIG. 17 illustrates the simulation of the average radius-optimized shape when the thickness is constant at 1 mm, 2 mm, 3 mm and 4 mm. It was confirmed that the optimized shapes of the struts derived through each simulation were derived as similar shapes. In this way, according to the second embodiment of the present disclosure, the average radius and thickness of the first strut and the second strut that can absorb shock while satisfying the strength may be derived by utilizing the energy equation. This may provide an advantage of optimizing the strength and stiffness ratio of the strut without restrictions on the thickness and diameter, and minimizing the weight.

The present disclosure provides the advantages of configuring the strut as the curved pipe to reduce the weight of the part and alleviate the impact load of the strut and landing gear through the physical properties and shape design of the strut.

In addition, the present disclosure provides the advantage of reducing the number of parts of the landing gear to make the maintenance and repair of the landing gear convenient.

In addition, the present disclosure provides the advantage of improving the manufacturing convenience and shortening the process time when manufacturing the strut through the shape design of the strut.

Although embodiments of the present disclosure have been described hereinabove with reference to the accompanying drawings, those skilled in the art to which the present disclosure pertains will be able to understand that the present disclosure may be implemented in other specific forms without departing from the spirit or essential feature of the present disclosure. Therefore, it is to be understood that embodiments described hereinabove are illustrative rather than being restrictive in all aspects.

What is claimed is:

1. A strut comprising:

a first strut and a second strut each configured as a curved hollow pipe;

a coupling connecting the first strut and the second strut;

a damper, wherein one end of the damper is connected to a front end of the first strut, and other end is connected to a rear end of the second strut, and the damper absorbs shock when the first strut and the second strut are deformed by the shock, wherein the coupling has a first portion inserted into the first strut and contacting an inner circumferential surface of the first strut, and a second portion inserted into the second strut and contacting an inner circumferential surface of the second strut, and wherein the first strut and the second strut are connected to each other by the coupling to form a C-shape, wherein a landing gear comprises a mounting unit that supports the strut on an aircraft, the landing gear comprising a wheel that contacts a ground during landing.

2. The strut of claim 1, wherein a pipe thickness of the first strut is constant from the front end to a rear end of the first strut, a pipe thickness of the second strut is constant from a front end to the rear end of the second strut, and the pipe thickness of the first strut is greater than or equal to that of the second strut.

3. The strut of claim 2, wherein when the pipe thickness of the first strut is $t_1$, and the pipe thickness of the second strut is $t_2$, $t_1/t_{2 \geq 1.25}$ is satisfied.

4. The strut of claim 1, wherein when an imaginary line connecting a center of the strut at the front end of the first strut and a center of the strut at the rear end of the second strut is L, an angle formed by the L with a horizontal plane is greater than or equal to 70°.

5. The strut of claim 1, wherein the damper includes a spring that absorbs the shock.

6. The strut of claim 1, wherein at least one of the first strut or the second strut is made of a composite material, and the composite material is designed to have a modulus E of elasticity value within a predetermined range.

7. The strut of claim 6, wherein the composite material is designed to have the modulus E of elasticity value of 30 Gpa or more and 150 Gpa or less.

8. The strut of claim 1, wherein the landing gear comprises a steering device that is connected to the strut which changes a direction of the strut and the wheel.

9. The strut of claim 1, wherein an inner diameter of the first strut increases linearly from the front end to a rear end of the first strut, and an inner diameter of the second strut decreases linearly from a front end to the rear end of the second strut.

10. The strut of claim 9, wherein when a smallest diameter among the inner diameters of the first strut is $D_a$, and a largest diameter is $D_b$, $D_b/D_a \geq 1.25$ is satisfied.

11. The strut of claim 9, wherein when a largest diameter among the inner diameters of the second strut is $D_c$, and a smallest diameter is $D_a$, $D/D_a \geq 1.25$ is satisfied.

* * * * *